United States Patent [19]

Reno

[11] Patent Number: 5,315,956
[45] Date of Patent: May 31, 1994

[54] BUS DUCT ABNORMAL TEMPERATURE INDICATOR

[76] Inventor: Ronald G. Reno, 5053 Williamson, Dearborn, Mich. 48126

[21] Appl. No.: 103,349

[22] Filed: Aug. 9, 1993

[51] Int. Cl.⁵ .............................................. G01K 1/02
[52] U.S. Cl. ..................................... 116/216; 116/215
[58] Field of Search ............... 116/215, 216, 217, 218; 374/152

[56] References Cited

U.S. PATENT DOCUMENTS

| | | | |
|---|---|---|---|
| 1,475,782 | 11/1923 | Beach | 24/11 R |
| 1,595,734 | 8/1926 | Scherer | 116/215 |
| 2,362,423 | 11/1944 | Walsh | 116/215 |
| 2,477,571 | 8/1949 | Billman et al. | 116/215 |
| 2,983,247 | 5/1961 | Greenspon | 116/106 |
| 3,586,320 | 6/1971 | Mace | 272.27/46 |
| 3,960,316 | 6/1976 | Echterling | 116/215 X |
| 3,971,333 | 7/1976 | Levy | 116/215 |
| 4,471,711 | 9/1984 | Graham | 116/216 |
| 4,480,749 | 11/1984 | Laucis et al. | 206/459 |

Primary Examiner—William A. Cuchlinski, Jr.
Assistant Examiner—W. Morris Worth
Attorney, Agent, or Firm—Charles W. Chandler

[57] ABSTRACT

An indicator particularly useful for indicating the increase in temperature for a bus bar joint, includes a first sheet-like member hingedly attached to a second sheet-like member. The first member is magnetically or adhesively attached to the bus duct cover. The second member is attached to the first member by a heat-sensitive adhesive. When the adhesive loses its adhesive properties upon reaching a predetermined temperature, the second member pivots down from the first member to provide an indication of an abnormal bus bar joint temperature.

6 Claims, 2 Drawing Sheets

BUS DUCT ABNORMAL TEMPERATURE INDICATOR

BACKGROUND OF THE INVENTION

This invention is related to an indicator particularly useful for indicating the temperature of a bus duct reaching an abnormal level. A bus duct is metal raceway the supports and contains a group of electrical bus bars. The duct comes in standard 10 foot lengths. Occasionally the bus bar joints become hot because of loosening of their compressed bolted connections which must be torqued and kept at a set foot pound value. Bolted joint connections must be re-torqued or re-tightened yearly, or as a bus bar manufacturer may specify. The problem is that it is not visually apparent that the bar temperature is rising to an abnormal level at the joint. Some electrical devices tend to give such an indication, but they are inadequate for a variety of reasons.

Some visual indicators of the prior art include U.S. Pat. No. 4,480,749 which was issued Nov. 6, 1984, to Peter K. Laucis and Robert Terry. This patent discloses a thermally sensitive indicator which uses a temperature sensitive liquid which changes color in response to a temperature of no less than 150°. The indicator visually indicates whether an excessive amount of heat has been applied to the container.

U.S. Pat. No. 4,471,711 which was issued Sept. 18, 1984, to Dennis I. Graham, discloses a conduit which experiences a color change to indicate that the conduit has been exposed to excessive heat. Smoke, dust, dirt and oil film which are the results of a manufacturing process, make it difficult to detect a color change.

U.S. Pat. No. 3,586,320 which was issued Jun. 22, 1971, to John A. Mace, discloses a sign that drops due to a high flame applied to wax.

U.S. Pat. No. 1,595,734 which was issued Aug. 10, 1926, to William H. Scherer, discloses a thermal-release temperature indicator.

U.S. Pat. No. 2,983,247 which was issued May 9, 1961, to Seymour A. Greehspon discloses a high temperature tell-tale which releases a weight in response to a temperature increase.

SUMMARY OF THE INVENTION

The broad purpose of the present invention is provide an inexpensive heat-sensitive indicator useful for indicating that a bus bar joint has reached an abnormal temperature level. The preferred embodiment of the invention comprises a poster board strip folded in half. The back half is attached to the bus duct by a magnetic cloth or tape. The front half of the indicator is attached to the back half by an adhesive that loses its adhesive strength within a narrow range of elevated temperatures. The front half of the indicator is a double poster board whose weight helps the indicator to unfold when the adhesive deteriorates. The unfolded indicator displays a message of an abnormal temperature existing at the joint.

Still further objects and advantages of the invention will become apparent to those skilled in the art to which the invention pertains upon referenced to the following detailed description.

DESCRIPTION OF THE DRAWINGS

The description refers to the accompanying drawings in which like reference characters refer to like references throughout the several views.

DESCRIPTION OF THE PREFERRED EMBODIMENT

Figure 1:
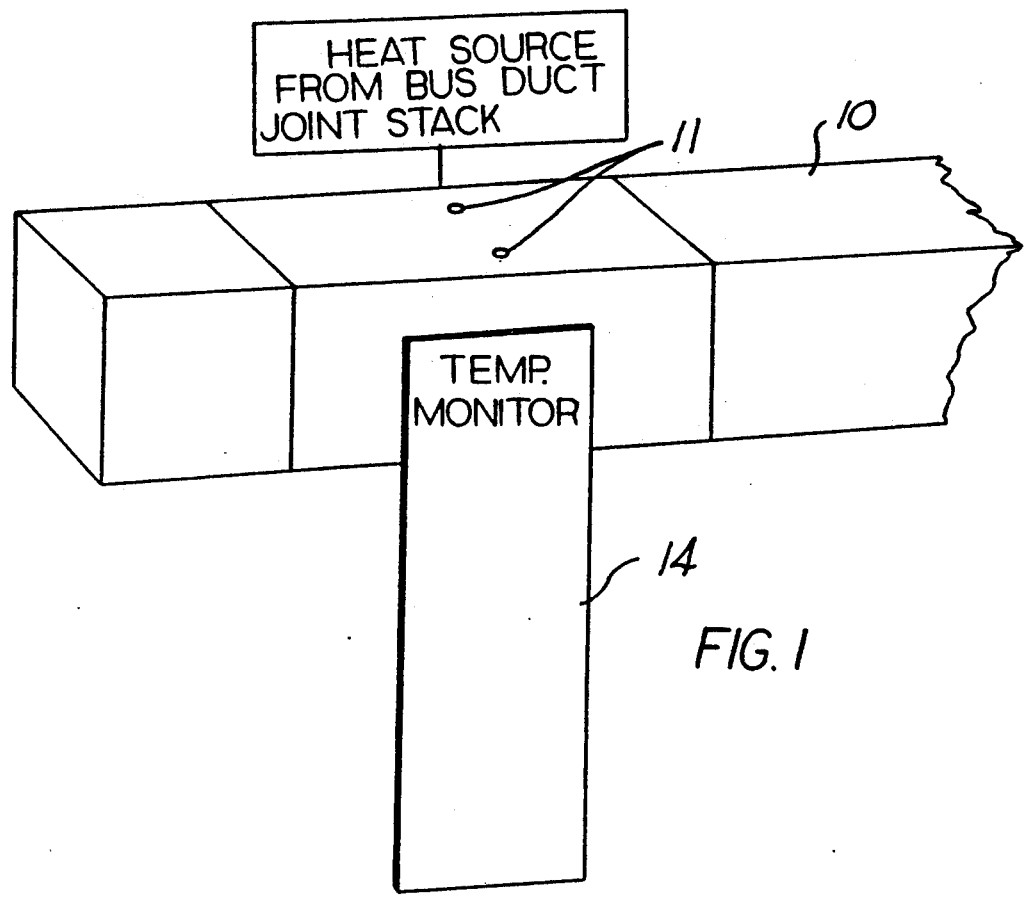
FIG. 1 illustrates a temperature indicator illustrating the preferred embodiment of the invention, mounted on a bus duct.
Figure 2:
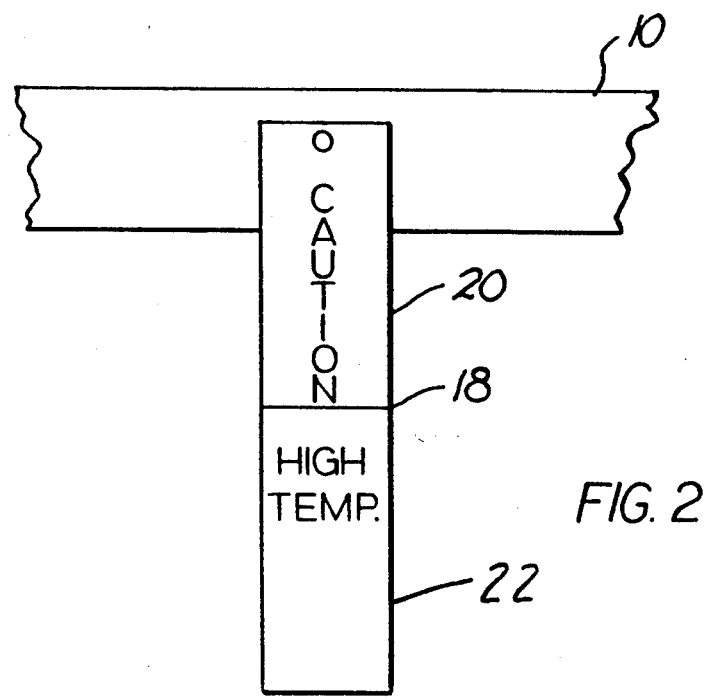
FIG. 2 is a view similar to FIG. 1 but showing the temperature indicator in the open position.
Figure 3:
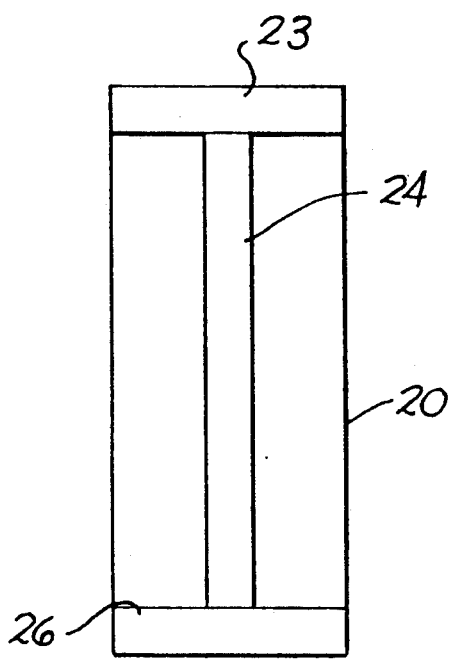
FIG. 3 is a view of the back of the temperature indicator.
Figure 4:
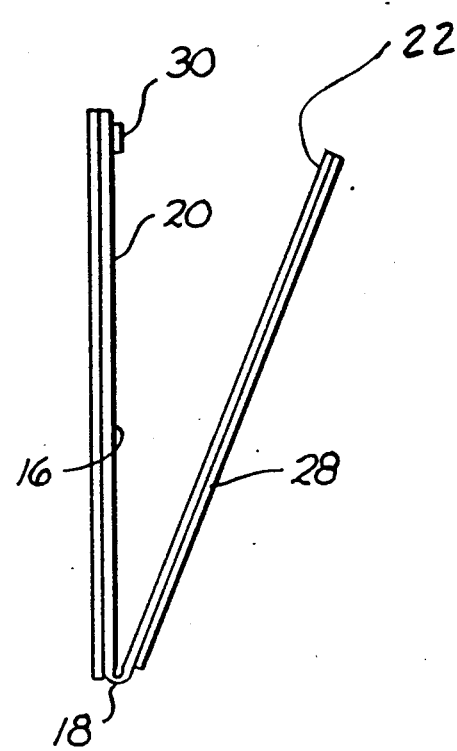
FIG. 4 is a side view of the temperature indicator in its partially opened position.

FIG. 1 shows a conventional electrical bus duct 10 formed of a magnetically attractive steel sheet metal component. Each bus duct 10 foot length has two electrical bus bar joint stacks which may provide a heat source 12 which may raise the temperature of the bus bar joint to an abnormal level to the point where sometimes a structure joint may burn, then fail due to loosening of fasteners 11. "Joint Stack" refers to one manufacturers method of connection. Other methods of joint connection do exist, and are used. Bus bar failure due to loose joint connection is common to all bus bar designs.

A preferred indicator 14 is mounted to the bus duct near the bus bar joint. Indicator 14 preferably comprises an elongated poster board body 16 folded in half to form a hinge 18. The body thus forms a back section 20 and a front section 22. For illustrative purposes, the indicator is 2" wide and each half is 6" long.

Three strips of magnetic cloth or tape 22, 24, and 26 are attached to the back half of the indicator by a high temperature adhesive preferably rated for about 650° F. before the adhesive deteriorates. Magnetic strip 22 is mounted in a horizontal position adjacent the top edge of the back half of the indicator. Magnetic strip 26 is mounted in a horizontal position adjacent the bottom horizontal edge of the back half of the indicator. Magnetic strip 24 is mounted in a vertical position along the center of the back half of the indicator. Magnetic strips 22, 24 and 26 provide means for releasably attaching the back half of the indicator to the bus duct in a location proximate the heat source, to aid in conducting heat to the adhesive board. An adhesive rated at 650° F. can be used to attach the back half to either an aluminum or other non-ferrous metal.

A piece of poster board 28, preferably about 2" wide and 6" long is also adhesively attached to the outside face of the front half of the indicator and labeled TEMPERATURE MONITOR as viewed in FIG. 1. The poster board adds a sufficient weight such that when the front half of the indicator is released from the back half, the front half of the indicator falls around hinge 18. The inside surface of the indicator preferably is color coated yellow with a message such as "CAUTION AND HIGH TEMPERATURE" indicating the existence of an abnormal temperature condition. Smoke, dust, dirt, and oil film do not affect the inside surface which is concealed until displayed.

A pad of adhesive 30 is attached adjacent the top edge of the back half. The adhesive pad should be disposed adjacent the inside top edge of the front half. The adhesive pad is an adhesive selected such that it loses its adhesive strength within a predetermined narrow range of temperatures. For illustrative purposes, adhesive pad 30 comprises a glue commonly used for construction. Such a glue is characterized in that it loses its adhesive strength at about 240° F. It is a waterproof glue commonly used for attaching dry wall to wood panels, e.g. a product sold under the trademark LIQUID NAILS. Other adhesives may be used for this range of temperatures or for other range of temperatures so long as they deteriorate or lose their adhesive characteristics in a predictable narrow range of temperatures.

Having described my invention, I claim:

1. A combination comprising a bus duct housing a plurality of bus bars having connected ends forming bus bar joints; and a visual indicator mounted on the bus duct to indicate that the bus duct temperature has reached a predetermined level, comprising:
   a temperature-sensitive adhesive, and means for mounting the adhesive on the bus duct proximate the location of said joints;
   a first indicator element adhesively connected to the adhesive and to said mounting so as to be movable by the force of gravity from a first position when connected by the adhesive, to a second position when released from the adhesive;
   wherein the adhesive loses sufficient adhesive properties upon reaching said predetermined temperature so as to release the indicator element; and
   said indicator element having indicia on one surface thereof which becomes viewable when the indicator element is in said second position.

2. A combination as defined in claim 1, in which the adhesive releases the indicator upon reaching a temperature of about 240° F.

3. A combination as defined in claim 1, in which the adhesive comprises a construction glue.

4. A combination as defined in claim 1, in which the adhesive mounting means comprises a second indicator element connected to the duct, and hinge means connecting the second element to the first element in such a manner that the first element is disposed in a raised position and adhesively attached by the temperature-sensitive adhesive to the second element such that when the adhesive means reaches said predetermined level, the first indicator element pivots downwardly about said hinge means.

5. A combination as defined in claim 4, in which the bus duct is magnetically attractive, and the adhesive mounting means includes magnetic means for connecting the second indicator element to the bus duct.

6. A combination comprising a heat sensitive visual indicator for indicating the increase in temperature of an object to a predetermined level, comprising:
   a heat-sensitive adhesive, and means for mounting the adhesive to the object;
   an indicator element adhesively connected to the adhesive and to said mounting means so as to be movable by the force of gravity from a first position when connected to the adhesive to a second position when released from the adhesive;
   wherein the adhesive loses sufficient adhesive properties upon reaching the predetermined level of temperature so as to release the indicator; and
   said indicator element having indicia on one surface thereof which becomes viewable when the indicator element is in said second position.

* * * * *